United States Patent [19]

Pav

[11] Patent Number: 4,457,057
[45] Date of Patent: Jul. 3, 1984

[54] FLEXURE-RESISTANT ROLL FOR USE IN CALENDERS OR THE LIKE

[75] Inventor: Josef Pav, Krefeld, Fed. Rep. of Germany

[73] Assignee: Kleinewegers GmbH, Krefeld, Fed. Rep. of Germany

[21] Appl. No.: 318,062

[22] Filed: Nov. 4, 1981

[30] Foreign Application Priority Data

Nov. 12, 1980 [DE] Fed. Rep. of Germany ....... 3042616

[51] Int. Cl.³ .............................................. B21B 29/00
[52] U.S. Cl. ................................................. 29/116 AD
[58] Field of Search ................... 29/113 AD, 116 AD

[56] References Cited

U.S. PATENT DOCUMENTS

| | | | |
|---|---|---|---|
| 3,846,883 | 11/1974 | Biondetti | 29/116 AD |
| 3,994,367 | 11/1976 | Christ | 29/116 AD |
| 4,328,744 | 5/1982 | Pav et al. | 29/116 AD |

FOREIGN PATENT DOCUMENTS

| | | | |
|---|---|---|---|
| 3001487 | 8/1980 | Fed. Rep. of Germany | 29/116 AD |
| 560334 | 3/1975 | Switzerland . | |

Primary Examiner—Neil Abrams
Attorney, Agent, or Firm—Peter K. Kontler

[57] ABSTRACT

A roll for use in calenders or like machines has a hollow cylindrical shell which spacedly surrounds a carrier and whose internal surface engages the external surfaces of several bearing elements each of which is biased against the shell by at least one hydraulic pressure generating device having a cylinder on the carrier or on the bearing element, a piston on the bearing element or on the carrier, and an annular seal recessed into the cylinder and engaging the periphery of the piston. The bearing elements can reciprocate in the radial direction of the shell as well as pivot about axes which are parallel with or normal to the axis of the shell due to the provision of swivelling joints having sockets machined into the bottom faces of cylinders in the respective cylinder chambers and spherical heads extending into the associated sockets and having shanks secured to the end faces of the respective pistons, or vice versa. Such mounting reduces or eliminates stresses upon the seals of the pressure generating devices including stresses which are generated by transverse forces tending to tilt the bearing elements in the shell. Such forces are transmitted by the bearing elements to the carrier by way of the corresponding joints.

17 Claims, 4 Drawing Figures

FLEXURE-RESISTANT ROLL FOR USE IN CALENDERS OR THE LIKE

CROSS-REFERENCE TO RELATED CASES

The applicant named in the present application and/or the assignee is the sole or joint owner of several United States patent applications including the following: Ser. No. 025,651 filed Mar. 30, 1979 (now U.S. Pat. No. 4,235,002 granted Nov. 25, 1980); Ser. No. 054,614 filed May 3, 1979 (now U.S. Pat. No. 4,311,091 granted Jan. 19, 1982); Ser. No. 083,632 filed Oct. 11, 1979 (now U.S. Pat. No. 4,290,351 granted Sept. 22, 1981); Ser. No. 097,961 filed Nov. 28, 1979 (now U.S. Pat. No. 4,290,353 granted Sept. 22, 1981); Ser. No. 191,691 filed Sept. 29, 1980; Ser. No. 196,123 filed Oct. 10, 1980 (now U.S. Pat. No. 4,328,744 granted May 11, 1982); Ser. No. 230,022 filed Jan. 30, 1981 (now U.S. Pat. No. 4,347,784 granted Sept. 7, 1982); Ser. No. 230,672 filed Feb. 2, 1981; Ser. No. 232,197 filed Feb. 6, 1981; Ser. No. 269,986 filed June 3, 1981 (now abandoned); Ser. No. 283,386 filed July 15, 1981; and Ser. No. 294,742 filed Aug. 20, 1981.

BACKGROUND OF THE INVENTION

The present invention relates to rolls which can be used in calenders or analogous machines to apply pressure to running webs of paper, textile material or the like. More particularly, the invention relates to improvements in flexure-resistant rolls of the type wherein a hollow cylindrical shell spacedly surrounds a stationary carrier and the shell accommodates a plurality of bearing elements and pressure generating devices which react against the carrier and urge the bearing elements against the internal surface of the shell in order to counteract the tendency of the shell to flex in response to external stresses. Such stresses are applied by the complementary roll or rolls of a machine wherein the flexure-resistant roll is installed, by the material which is treated during travel through the nip of the rolls, by gravity and/or a combination of such factors. As a rule, the pressure generating devices comprise hydraulic cylinder and piston units wherein the piston reciprocates in the cylinder and a seal prevents uncontrolled escape of hydraulic fluid from the cylinder chamber. It is also known to provide such rolls with swivelling joints which are disposed between the bearing elements and the carrier in order to allow the bearing elements to move with reference to the carrier in several directions, e.g., radially of the shell as well as about an axis which is parallel to or normal to the axis of the shell. Such swivelling joints normally comprise a substantially spherical head which is rigid with the piston of a pressure generating device and a socket which reciprocably receives the head and is machined into or constitutes the cylinder of the respective pressure generating device in such a way that its axis coincides with the axis of the cylinder. Reference may be had, for example, to FIG. 8 of the aforementioned commonly owned copending application Ser. No. 196,123 of Pav et al. (now U.S. Pat. No. 4,328,744 granted May 11, 1982) which shows a spherical head on the carrier and a socket in the bearing element.

Flexure-resistant rolls which embody the aforediscussed features have found widespread acceptance in many industries, especially in plants which employ calenders, smoothing machines and the like for the treatment of webs which consist of paper, textile or synthetic plastic material. The purpose of the pressure generating devices in combination with swivelling joints and bearing elements is to resist deformation of the shell, to compensate for such deformation, to cause the shell to bear against a running web with a predetermined force and/or to allow for radial or sidewise shifting of the shell.

Swiss Pat. No. 560,334 discloses a flexure-resistant roll wherein the bearing elements are rigidly connected with the pistons of the associated pressure generating devices and the cylinders of such devices are rigidly connected with the stationary carrier. That portion of each piston which extends into the chamber of the respective cylinder has a spherical head and the maximum-diameter portion of the head carries a seal which engages the internal surface of the respective cylinder. Such mounting enables the bearing elements to move radially of the shell as well as to perform pivotal movements about one or more axes including the centers of the respective spherical heads. This, in turn, ensures that the exposed surfaces of the bearing elements can remain in contact with or do not move away from adjacent portions of the internal surface of the shell.

When a roll of the above outlined character is in actual use, its shell is often subjected to the action of transverse forces which develop as a result of frictional engagement between the external surface of the shell and the external surface of an adjacent roll and/or as a result of frictional engagement with a web which is caused to advance through the nip between the shell and a neighboring roll. Furthermore, and if the plane in which the shell receives stresses is not a vertical plane, the shell must also withstand pronounced transverse stresses which are attributable to the weight of the parts of the roll and are transmitted to the carrier by way of the bearing elements and the corresponding swivelling joints. The immediate result is that the seals between the cylinders and pistons of the pressure generating devices are subjected to extensive wear in addition to that wear which is attributable to tilting movements of the bearing elements. Therefore, the useful life of such seals is very short or the pressure generating devices allow the escape of excessive quantities of hydraulic fluid.

OBJECTS AND SUMMARY OF THE INVENTION

An object of the invention is to provide a novel and improved flexure-resistant roll wherein the seals of the pressure generating devices are subjected to less pronounced stresses so that they can stand long periods of use.

Another object of the invention is to provide a roll of the above outlined character wherein the seals of the pressure generating devices can be relieved without necessitating the provision or utilization of additional seals.

A further object of the invention is to provide a flexure-resistant roll for use in calenders or the like wherein the swivelling joints between the carrier and the bearing elements are constructed and assembled in a novel and improved way.

An additional object of the invention is to provide a flexure-resistant roll wherein the swivelling joints between the components of the pressure generating devices are mounted, constructed and assembled in a novel and improved way.

An ancillary object of the invention is to provide novel and improved pressure generating devices for use between the carrier and the bearing elements of a roll for calenders, smoothing machines and like apparatus wherein a cylindrical shell spacedly surrounds a stationary carrier.

The invention is embodied in a pressure applying roll, especially for use in calenders or analogous machines to define with a parallel complementary roll a nip for the passage of webs consisting of paper, textile or other material. The improved roll comprises a hollow rotary cylindrical shell having a preferably cylindrical internal surface, a stationary carrier element extending through and spacedly surrounded by the shell, bearing means including at least one bearing element interposed between the carrier element and the shell and having a second surface complementary to and adjacent to the internal surface of the shell, and fluid-operated pressure generating means for urging the surface of the bearing element toward the internal surface of the shell. The pressure generating means comprises a cylinder member which is rigid with one of the elements (i.e., with the carrier element or with the bearing element), a piston member which is rigid with the other element (i.e., with the bearing element or with the carrier element), and a seal which is interposed between the two members. The cylinder member has a chamber for the piston member and a bottom face in the chamber, and the piston member has an end face located opposite the bottom face in the chamber of the cylinder member. The improved roll further comprises a swivelling joint which is disposed between the two members of the pressure generating means and includes a first component constituting a socket extending inwardly from the face of one of the members (i.e., inwardly from the end face of the piston member or inwardly from the bottom face in the chamber of the cylinder member) and having a substantially cylindrical surface which is coaxial with the one member. The joint further comprises a second component which is rigid with and extends from the face of the other member. The second component has a preferably spherical head which is reciprocably and tiltably received in the socket. The second component preferably further comprises a shank or stem which connects the head with the corresponding (other) member of the pressure generating means. The seal between the two members of the pressure generating means can constitute an annulus which is mounted in the other member, preferably in the cylinder. The plane of such seal preferably includes or is closely adjacent to the center of the head. Otherwise stated, the center of the head and the seal can be located at the same or substantially the same distance from the axis of the shell.

The head of the second component divides the interior of the socket into a pair of compartments which are at least substantially sealed from each other in the region of the cylindrical surface of the socket (i.e., the head can be received in the socket with minimal or negligible play). The roll then preferably further comprises means for communicatively connecting the two compartments, and such connecting means may constitute one or more channels which are machined into the second component of the swivelling joint.

One or more hydrostatic seals can be installed between the two surfaces to prevent direct contact between the material of the shell and the material of the bearing element.

The novel features which are considered as characteristic of the invention are set forth in particular in the appended claims. The improved roll itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
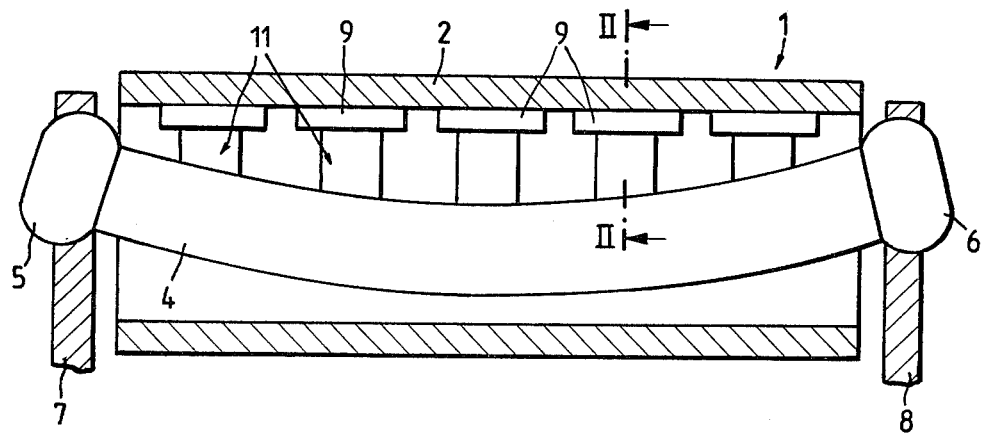
FIG. 1 is a schematic central longitudinal vertical sectional view of a flexure-resistant roll which embodies one form of the present invention.
Figure 2:
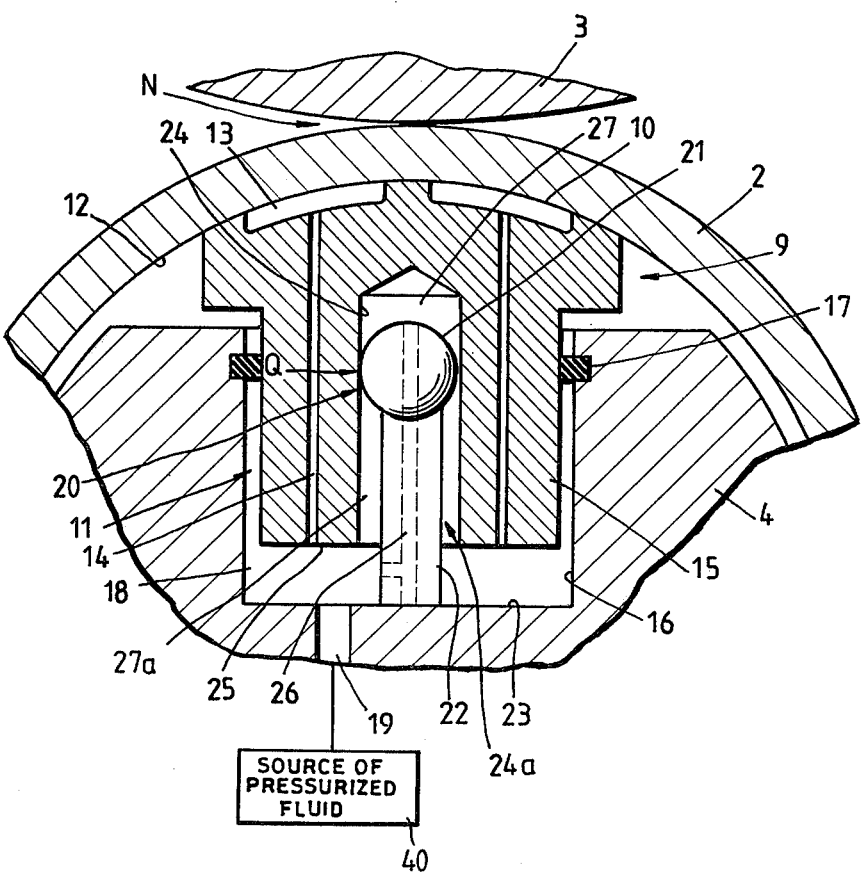
FIG. 2 is an enlarged fragmentary transverse vertical sectional view as seen in the direction of arrows from the line II—II of FIG. 1, further showing a portion of a complementary roll.

FIG. 1 shows a flexure-resistant roll 1 which comprises a hollow cylindrical shell 2 cooperating with a parallel complementary roll 3 (see FIG. 2). The two rolls define a nip N for the passage of a web (not shown) of paper, textile or other material. The shell 2 of the roll 1 spacedly surrounds a stationary carrier 4 whose end portions carry or are integral with spherical enlargements 5 and 6 extending into complementary sockets of stationary supports 7 and 8 forming part of a calender or a like machine. In order to prevent undue flexing of the shell 2, e.g., in response to the pressure which is applied by the roll 3 and/or by the web of material travelling through the nip N, the interior or the shell 2 accommodates a battery of bearing elements 9 which are disposed in a row extending in parallelism with the axis of the shell 2 and have convex external surfaces 10 adjacent to the cylindrical internal surface 12 of the shell 2. The roll 1 further comprises pressure generating devices 11, one for each of the bearing elements 9, which serve to urge the surfaces 10 toward the internal surface 12 of the shell 2. The pressure generating devices 11 are hydraulic cylinder and piston units whose cylinders 16 are integral with the carrier 4 and whose pistons 15 are integral with the respective bearing elements 9. The pistons 15 spacedly extend into the chambers 18 of the respective cylinders 16, and each cylinder carries an annular seal 17 which is recessed into the surface surrounding the cylinder chamber 18 and sealingly engages the cylindrical peripheral surface of the associated piston 15.

Hydrostatic seals are provided between the surfaces 10 and 12 to prevent direct metal-to-metal contact between the shell 2 and the bearing elements 9. Each hydrostatic seal has one or more shallow recesses or pockets 13 machined into the surface 10 of the respective bearing element 9, and each pocket 13 communicates with the respective cylinder chamber 18 by way of at least one flow restricting channel 14 which is machined into the associated piston 15.

The cylinder chamber 18 of each pressure generating device 11 receives pressurized fluid from a suitable source 40 by way of one or more channels or bores 19 machined into the carrier 4. By regulating the pressure of hydraulic fluid which is admitted into the chambers 18 of the pressure generating devices 11, one can cause the bearing elements 9 to apply vertically upwardly acting forces of selected magnitude to the corresponding portions of internal surface 12 of the shell 2. Reference may be had to the aforementioned U.S. Pat. No. 4,290,353. This patent discloses detectors which monitor the distance between several portions of the shell and the carrier and transmit corresponding signals serving to regulate the resistance which the corresponding portions of the shell offer to flexure. Analogous detectors can be used to regulate the pressure of fluid in the cylinder chambers 18.

A swivelling joint 20 is provided for each bearing element 9, i.e., for each pressure generating device 11. Each swivelling joint 20 comprises a first component 24a which is a socket machined into the end face 25 of the piston 15, namely, into that face of the piston which faces the bottom face 23 in the chamber 18 of the respective cylinder 16. The socket 24a has a cylindrical surface 24 whose axis coincides with the axis of the respective piston 15. A second component of each swivelling joint 20 comprises a spherical head 21 which extends into and is reciprocable as well as otherwise movable in the socket 24a, and a stem or shank 22 which connects the head 21 with the cylinder 16 and extends from the bottom surface 23. The cylinder 16 establishes a rigid connection between the shank 22 and the carrier 4.

The diameter of the head 21 closely approximates the diameter of the cylindrical surface 24 so that the head 21 divides the interior of the respective socket 24a into a first compartment 27 which is remote from the end face 25 and a second compartment 27a which is in direct communication with the cylinder chamber 18. The means for communicatively connecting the compartments 27 and 27a with each other comprises a channel 26 having a first open end communicating with the chamber 18 (and hence with the compartment 27a) and a second open end communicating with the compartment 27. It will be noted that the channel 26 extends substantially axially of the shank 22 and through the head 21 of the second component of the joint 20. The plane of the seal 17 includes or is closely adjacent to the center of the head 21. Otherwise stated, the distance between the plane of the seal 17 and the axis of the shell 2 equals or approximates the distance between such axis and the center of the head 21.

When the bearing element 9 of FIG. 2 is subjected to the action of a transverse force Q, for example, because the driven roll 3 is in frictional engagement with the external surface of the shell 2 or because friction which is generated by pressurized fluid tends to cause the bearing element 9 to turn with the shell 2, the bearing element 9 transmits the force Q to the piston 15 wherein the surface 24 transmits the force to the head 21 which, in turn, transmits the force to the carrier 4. This does not entail any shifting of the piston 15 in a direction at right angles to its axis so that the seal 17 is not affected by the transmission of force Q from the bearing element 9 to the carrier 4. In other words, the seal 17 merely performs the function of preventing leakage of pressurized fluid from the chamber 18 but need not resist or be acted upon by stresses which are transmitted between the bearing element 9 and the carrier 4. Also, the seal 17 need not guide the piston 15 in the cylinder 16 because the function of guiding is performed by the surface 24 and head 21 of the joint 20. In fact, even if the piston 15 is tilted with reference to the head 21 or vice versa, the displacement of the piston 15 with reference to the cylinder 16 in the plane of the seal 17 is negligible, i.e., the seal 17 is not subjected to any stresses of such magnitude as would tend to rapidly terminate its useful life. On the other hand, the joint 20 allows the bearing element 9 to assume a plurality of different positions so that the distance between its surface 10 and the adjacent portion of the internal surface 12 of the shell 2 remains at least substantially unchanged. The bearing element 9 is also movable radially of the cylinder 16 because the surface 24 can slide along the head 21 in the axial direction of the piston 15. In addition, and as mentioned above, the bearing element 9 can be readily tilted relative to the component including the head 21 and the shank 22 without unduly stressing the seal 17 of the pressure generating device 11.

Figure 3:
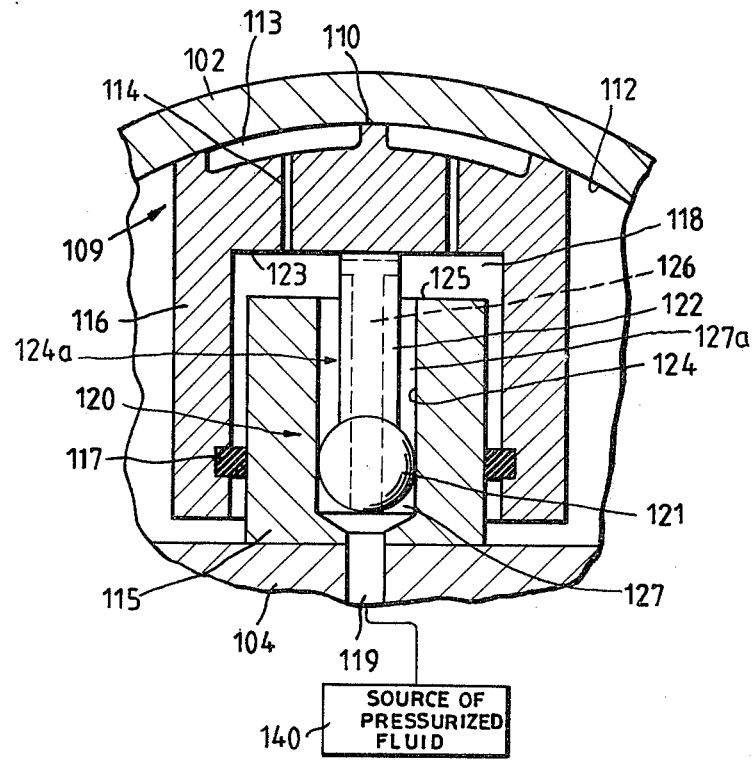
FIG. 3 is a fragmentary transverse sectional view of a second roll.

FIG. 3 shows a portion of a second roll wherein all such parts which are identical with or clearly analogous to corresponding parts of the roll 1 are denoted by similar reference characters plus 100. In this embodiment of the invention, the cylinder 116 is integral with the bearing element 109 and the piston 115 is integral with the carrier 104. The shank 122 for the spherical head 121 extends from the bottom surface 123 in the chamber 118 of the cylinder 116, and the socket 124a of the joint 120 extends into the end face 125 of the piston 115. The channel or bore 119 which connects the cylinder chamber 118 with the source 140 of pressurized hydraulic fluid is provided in the carrier 104 and communicates directly with the compartment 127. The latter communicates with the chamber 118, and hence with the compartment 127a at the other side of the head 121, by way of a channel or bore 126 having a first open end provided in the head 121 and in communication with the compartment 127, and two additional open ends communicating with the chamber 118. The plane of the seal 117 between the piston 115 and the cylinder 116 of the pressure generating device is again located at or close to the center of the head 121.

An advantage of the roll which is shown in FIG. 3 is that the head 121 can be received in the socket 124a with a minimum of clearance. This is due to the provision of the channel 126 which establishes communication between the compartments 127 and 127a at the opposite sides of the head 121; this channel prevents the establishment of pronounced counterpressure in the compartment 127, i.e., in that compartment which is remote from the chamber 118 of the cylinder 116. Moreover, hydraulic fluid which flows via channel 126 ensures satisfactory lubrication of component parts of the joint 120. The provision of channel 126 in the shank 122 and head 121 is desirable and advantageous because this obviates the need for additional machining of the piston 115, cylinder 116, bearing element 109 and/or carrier 104. The establishment of communication between the source 140 and the chamber 118 via compartment 127 and channel 126 simplifies the admission of pressurized fluid into the cylinder 116.

Figure 4:
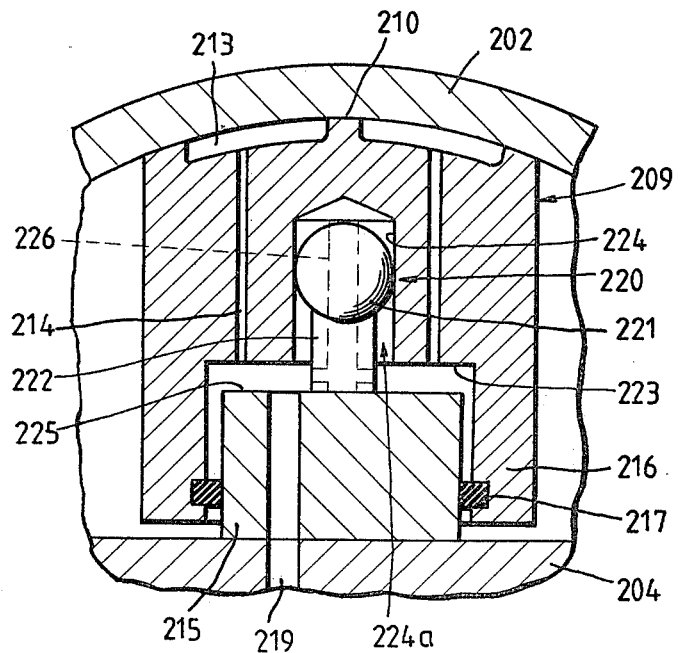
FIG. 4 is a similar fragmentary transverse vertical sectional view of a third roll.

Referring to FIG. 4, there is shown a portion of a third roll wherein all such parts which are identical with or clearly analogous to corresponding parts of the roll 1 of FIG. 2 are denoted by similar reference characters plus 200. The cylinder 216 of the pressure generating device is integral with the bearing element 209, and the piston 215 is integral with the carrier 204, i.e., the same as in the embodiment of FIG. 3. The socket 224a is machined into the bottom face 223 of the cylinder 216, and this socket receives the spherical head 221 which is carried by a shank 222 rigid with the piston 215 and extending from the end face 225. In this embodiment, the plane of the seal 217 between the cylinder 216 and the piston 215 is remote from the center of the head 221. The channel 226 connects the two compartments of the socket 224a and extends through the head 221. The cylinder chamber communicates directly with the channel 219 which is connected with the source of pressurized hydraulic fluid.

An important advantage of the improved roll is that the swivelling joints and the seals of the respective pressure generating devices are separated from each other. The transverse forces can be transmitted from the bearing elements to the carrier by way of the swivelling joints without in any way stressing the seals of the pressure generating devices or by subjecting such seals to stresses which are a minute fraction of stresses arising in conventional rolls, for example, in rolls of the type disclosed in the aforediscussed Swiss Pat. No. 560,334. This ensures that the chambers of the cylinders in the pressure generating devices are properly sealed for long periods of time, i.e., that the useful life of the seals is a multiple of that of seals in conventional rolls regardless of whether the improved roll is subjected to the action of pronounced or minor transverse forces and irrespective of the frequency at which such transverse forces arise.

An advantage of the embodiments which are shown in FIGS. 2 and 3 is that the shank of the second component of the swivelling joint extends from the bottom face of the cylinder. This contributes to compactness of the combined joint and pressure generating device. Thus, the head extends into a socket which is machined into the piston so that the head need not extend beyond the end face of the piston. The embodiments of FIGS. 2 and 3 exhibit the additional advantage that the seal 17 or 117 is provided on that member (16 or 116) of the pressure generating device which carries the component 21-22 or 121-122 of the respective swivelling joint. This renders it possible to place the center of the head 21 or 121 into the general plane of the seal 17 or 117 with the result that the seal is even less likely to undergo pronounced stresses in response to tilting of the sealing element 9 or 109. Moreover, such mounting of the seal 17 or 117 simplifies the task of calculating the magnitude of stresses to which the seal is subjected when the roll is in actual use. Still further, such mounting of the seal results in a pronounced reduction of lever arms between the swivelling joint 20 or 120 and the respective seal 17 or 117, i.e., in the aforediscussed reduction or minimizing of stresses to which the seal is subjected in response to tilting of the bearing element 9 or 109. Since the seal 17 or 117 is an annulus which spacedly surrounds the respective head 21 or 121 and its plane includes or is close to the center of the head irrespective of the orientation of bearing element 9 or 109 with reference to the head, the seal is shielded from any or almost any transverse forces irrespective of the origin of such forces.

Mounting of the piston (115 or 215) on the carrier (104 or 204) contributes to simplicity of the improved roll. This renders it possible to provide a rudimentary (e.g., threaded) connection between the piston and the carrier. Moreover, and referring again to FIG. 3, mounting of the piston on the carrier does not contribute to the bulk of the roll and/or of the parts in the interior of the shell if the socket (124a) is machined into the end face of the piston.

The improved roll is susceptible of many additional modifications without departing from the spirit of the invention. For example, the shell of a roll can be mounted on only two bearing elements which are disposed at the axial ends of the shell. In other words, and referring to FIG. 1, the two outermost bearing elements can be moved even nearer to the respective ends of the shell 1, and each such bearing element can be provided or associated with a pressure generating device as well as with a swivelling joint which is constructed, assembled and mounted in accordance with the invention. Still further, the invention can be embodied in rolls wherein each bearing element is associated with two or more pressure generating devices. In such rolls, it normally suffices if only one of two or more pressure generating devices for a given bearing element is associated with a swivelling joint in a manner as shown in FIG. 2, 3 or 4. Reference may be had to the aforementioned copending application Ser. No. 196,123 (now U.S. Pat. No. 4,328,744 granted May 11, 1982) which discloses bearing elements cooperating with several pressure generating devices.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the means and range of equivalence of the appended claims.

I claim:

1. A pressure applying roll for use in calenders or the like to define with a parallel complementary roll a nip for the passage of webs of paper, textile or other material, comprising a hollow cylindrical rotary shell having an internal surface; a stationary carrier element extending through and spacedly surrounded by said shell; bearing means including at least one bearing element interposed between said carrier element and said shell and having a second surface complementary to and adjacent to said internal surface; fluid-operated pressure generating means for urging said second surface toward said internal surface, comprising a cylinder member rigid with one of said elements, a piston member rigid with the other of said elements, and a seal interposed between said members, said cylinder member having a chamber for said piston member and a bottom face in said chamber, said piston member having an end face disposed opposite said bottom face; and a swivelling joint disposed between said members and including a first component constituting a socket extending inwardly from said face of one of said members and having a substantially cylindrical surface coaxial with said one member, said joint further comprising a second component rigid with and extending from said face of the other of said members and having a head tiltably received in said cylindrical surface, the diameter of said head closely approximating the diameter of said cylindrical surface so that said head is reciprocably slidable along said cylindrical surface in the direction of the axis of said cylindrical surface.

2. The roll of claim 1, wherein said head is a substantially spherical head and said second component further comprises a shank connecting said head to said other member of said pressure generating means.

3. The roll of claim 1, wherein said socket extends into the end face of said piston member, said second component being rigid with said cylinder member.

4. The roll of claim 1, wherein said seal is an annulus which is mounted in said other member.

5. The roll of claim 4, wherein said other member is said cylinder member.

6. The roll of claim 1, wherein said seal and said head are disposed substantially at the same distance from the axis of said shell.

7. The roll of claim 1, wherein said seal is an annular body which is disposed in a predetermined plane and said head has a center which is located in or close to said plane.

8. The roll of claim 1, wherein said socket is provided in the bottom face of said cylinder member.

9. The roll of claim 1, wherein said head divides the interior of said socket into first and second compartments located at the opposite sides of said head, as considered in the axial direction of said socket, and further comprising means for communicatively connecting said compartments with each other.

10. The roll of claim 9, wherein said head at least substantially seals said compartments from each other.

11. The roll of claim 9, wherein said connecting means comprises a channel.

12. The roll of claim 11, wherein said channel is provided in said other component of said joint.

13. The roll of claim 1, wherein said cylinder member and said second component are rigid with said bearing element.

14. The roll of claim 13, wherein said head divides the interior of said socket into a first compartment nearer to said end face and a second compartment more distant from said end face, and further comprising a source of pressurized fluid and means for connecting said source with said second compartment.

15. The roll of claim 14, wherein said first compartment communicates with said chamber and further comprising means for communicatively connecting said compartments with each other.

16. The roll of claim 15, wherein said means for connecting said compartments with each other includes a channel provided in said second component.

17. The roll of claim 1, further comprising hydrostatic seal means interposed between said surfaces.

* * * * *